July 28, 1942.　　A. J. PAPULSKI　　2,291,101
ELECTROMAGNETIC VALVE
Filed Aug. 5, 1939
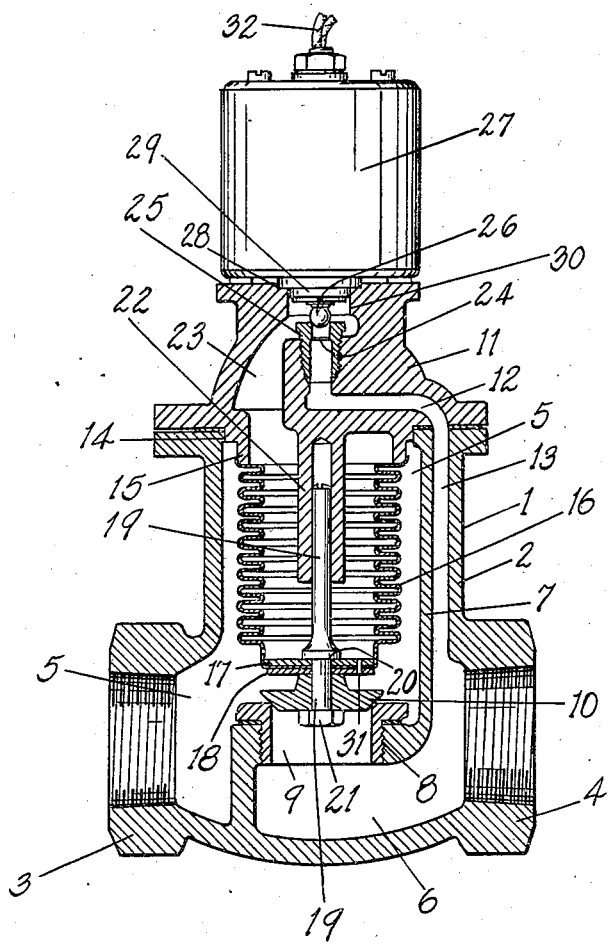
INVENTOR.
Alexander J. Papulski
BY Earl & Chappell
ATTORNEY.

Patented July 28, 1942

2,291,101

UNITED STATES PATENT OFFICE 2,291,101

ELECTROMAGNETIC VALVE

Alexander J. Papulski, Three Rivers, Mich., assignor to Armstrong Machine Works, Three Rivers, Mich.

Application August 5, 1939, Serial No. 288,552

1 Claim. (Cl. 137—139)

This invention relates to improvements in electromagnetic valves.

The main objects of this invention are:

First, to provide an improved pressure actuated electromagnetically controlled valve.

Second, to provide a valve of the type described which is compact in construction and economical of parts.

Third, to provide a fluid pressure responsive electromagnetically controlled valve for steam or other fluid or liquid systems which is very sensitive, quick in action, economical in its parts, and compact in its construction.

Further objects relating to details and economies of my invention will definitely appear from the description to follow. The invention is defined in the claim.

A structure embodying the features of my invention is illustrated in the accompanying drawing, the single figure of which is a view in elevation and partially in vertical section illustrating a preferred embodiment of a valve in accordance with my invention.

The present invention relates to a fluid pressure actuated valve including pressure sensitive valve actuating means and means for controlling the actuation of the said pressure sensitive means, including an electromagnetic pilot element adapted to govern the building up or exhausting of a vapor or fluid pressure on the said pressure sensitive means. This pressure sensitive means is in the form of a bellows element connected to and actuating a steam valve permitting various guiding elements for the valve to be disposed therein and thereby effecting a considerable economy of space as will be apparent.

Referring to the drawing, the valve in its entirety is generally designated 1 and consists of an integral generally cylindrical cast casing or housing 2 having inlet and discharge fittings 3, 4, respectively, for communicating the inlet or upstream discharge or downstream chambers 5, 6 with upstream and downstream conduits or other elements (not shown).

These chambers are separated by a partition 7 integral with the housing and they communicate through a valve opening 8 in the partition which is threaded to receive a flanged valve seat bushing 9. A vertically reciprocable valve 10 actuated by instrumentalities to be hereinafter described coacts with the valve seat bushing 9 to close or open a passage between chambers 5, 6.

The reference numeral 11 in general indicates a suitable head for the open topped housing 2, which is fitted thereto with a gasket interposed and coacts with the side walls and partition 7 to close the upper end of housing 2. The head has a small by-pass passage 12 which in operative position of the head communicates with the vertical passage 13 between the partition 7 and side wall of the housing. The head has a depending shoulder 14 fitting into the upper end of the inlet chamber 5 to provide a fluid or liquid tight closure therefor, and the shoulder is provided with a depending annular flange 15 to which one end of a flexible corrugated bellows member 16 is connected.

The other end of the bellows 16 is secured between a pair of end disks 17, 18 which are apertured centrally to receive a valve stem 19 on valve 10, said stem being positioned on the valve by a shoulder 20 on the stem internally of the bellows and having an end nut 21 threaded thereon to draw the parts into assembled relation. Stem 19 extends upwardly internally of the bellows and is guided for vertical reciprocating movement in a depending hollow guide element 22 integral with head 11. The extent of its vertical upward movement is limited by abutment with the end of the guide.

The interior of bellows 16 is in communication with inlet chamber 5 through a small pressure equalizing port 31 formed in the bellows end plates 17, 18 and is also adapted to be placed in communication with the by-pass passage 12 in the head through a suitable recess or chamber 23 in the head and through a valve opening 24 which is in effect a continuation of passage 12. This opening is of substantially greater area than port 31 and is provided by a suitable valve seat member 25 threaded in the head. It is controlled by a pilot or bleeding valve 26.

Valve 26 is connected to and actuated by an electromagnet 27 energized by leads 32 and the electromagnet casing is positioned on and serves as a closure for the upper end of head 11, having annular shoulders 28, 29 telescoping within the countersunk bore 30 at the top of the head.

In operation, with the pilot valve 26 closed, steam or other fluid or liquid handled by the valve passes from inlet chamber 5 into the interior of bellows 16 through port 31. Having no outlet through valve opening 24, the pressure within the bellows becomes equal to that on the exterior of the bellows and the force exerted on the interior of the bellows equals that exerted exteriorly on the same by the fluid. Hence, the valve 10 is maintained in closing relation to the valve seat 9 by the spring or resiliency inherent in the flexible metal bellows plus the pressure on valve 10. However, when pilot valve 26 is electromagnetically opened, the fluid under pressure within the bellows is by-passed through valve opening 24 and passages 12, 13 to the discharge chamber 6. Since the orifice or opening 24 is greater in area than bellows port 31, it follows that when valve orifice 24 is open it is impossible to build up as great a pressure internally of the bellows as externally, and the result is that the spring of the bellows is counteracted by the greater pressure on the exterior of the bellows. Accordingly, the bellows is caused to contract and valve 10 uncovers the valve seat opening and communicates inlet chamber 5 directly with discharge chamber 6.

In practice, the electromagnet 27 draws a very slight amount of current, say, less than ten watts. I prefer that the valve 26 be urged downwardly against its seat by gravity or a suitable spring and to be drawn off the seat by energization of the electromagnet, although it will be apparent to those skilled in the art that the operation might be altered and a suitable spring or other agency employed to urge the pilot valve upwardly, the same being actuated in the opposite direction by electromagnetic or similar means.

I have illustrated and described my improvements in an embodiment which is very practical. I have not attempted to illustrate or describe other embodiments or adaptations as it is believed this disclosure will enable those skilled in the art to embody or adapt my improvements as may be desired.

Having thus described my invention what I claim as new and desire to secure by Letters Patent is:

A pressure responsive valve comprising a generally cylindrical casing having inlet and discharge chambers therein separated by a transverse partition and adapted to be communicated through a valve opening in said partition, a closure head for said casing mounted concentrically thereon, a valve vertically reciprocable in said inlet chamber for controlling said valve opening, a stem on which said valve is carried for reciprocation, a sleeeve integral with and depending from said head telescopingly receiving the stem and guiding and limiting the valve and stem movement during reciprocation thereof in said casing, and means for actuating said valve comprising a flexible corrugated metal bellows in said inlet chamber surrounding and enclosing said stem and sleeve, said bellows having its upper end secured to said head in said inlet chamber and being connected at its lower end to an end closure plate member fixed to said stem, said end plate member having a pressure equalizing aperture therein communicating the interior of the bellows with said inlet chamber, said casing having by-pass means including a by-pass passage between said partition and the external wall thereof adapted to communicate the discharge chamber with the interior of said bellows, said passage including a fixed valve orifice, the minimum area of said by-pass means being greater than the area of said aperture, an electromagnet mounted on said head, and a vertically reciprocable pilot valve actuated by said electromagnet and controlling said valve orifice, said pilot valve being adapted when open to vent fluid from the interior of said bellows through said passage to said discharge chamber, whereby the pressure in said bellows is less than the pressure exterior of said bellows to contract the bellows and raise the first named valve and expose said first named opening, said pilot valve when closed cutting off communication of the discharge chamber with the bellows interior, whereby pressure built up in said interior through said aperture equals that externally of said bellows in said inlet chamber and the first named valve closes the first named valve opening under the influence of the inherent flexibility of the bellows and the pressure on the valve in the inlet opening.

ALEXANDER J. PAPULSKI.